(12) United States Patent
Judd

(10) Patent No.: US 11,208,776 B1
(45) Date of Patent: Dec. 28, 2021

(54) FECAL MATTER SCOOPER

(71) Applicant: Terrence K. Judd, Queens, NY (US)

(72) Inventor: Terrence K. Judd, Queens, NY (US)

(*) Notice: Subject to any disclaimer, the term of this patent is extended or adjusted under 35 U.S.C. 154(b) by 32 days.

(21) Appl. No.: 16/944,695

(22) Filed: Jul. 31, 2020

(51) Int. Cl.
*A01K 29/00* (2006.01)
*E01H 1/12* (2006.01)
*A01K 23/00* (2006.01)

(52) U.S. Cl.
CPC ......... *E01H 1/1206* (2013.01); *A01K 23/005* (2013.01); *E01H 2001/1293* (2013.01)

(58) Field of Classification Search
CPC .............. A01K 23/005; E01H 1/1206; E01H 2001/1293
USPC ............................................ 294/1.3, 1.4, 1.5
See application file for complete search history.

(56) References Cited

U.S. PATENT DOCUMENTS

| | | | | |
|---|---|---|---|---|
| 3,872,834 A * | 3/1975 | Fuhrman | ............... | A01K 15/003 119/801 |
| 4,010,970 A * | 3/1977 | Campbell | ............ | A01K 23/005 294/1.5 |
| 4,136,900 A * | 1/1979 | Thompson | ............ | E01H 1/1206 294/1.5 |
| 4,185,861 A * | 1/1980 | Berner | ................ | A01K 23/005 294/1.5 |
| 4,335,678 A * | 6/1982 | Garza | .................. | A01K 23/005 294/1.5 |
| 4,466,647 A * | 8/1984 | Spevak | ............... | A01K 23/005 294/1.5 |
| 4,878,703 A * | 11/1989 | Yoshioka | ............. | A01K 23/005 294/1.5 |
| 5,290,080 A * | 3/1994 | Yoshioka | ............. | A01K 23/005 294/1.5 |
| 5,344,200 A * | 9/1994 | Yoshioka | ............. | A01K 23/005 294/1.5 |
| 6,039,370 A * | 3/2000 | Dooley, Jr | ........... | A01K 23/005 248/99 |
| 7,780,209 B1 * | 8/2010 | Morrissey | ............ | A01K 23/005 294/1.5 |
| 2015/0216143 A1 * | 8/2015 | Christlieb | ............ | A01K 23/005 294/1.5 |

* cited by examiner

*Primary Examiner* — Paul T Chin

(57) ABSTRACT

A new fecal matter scooper for pets is described. The fecal matter scooper includes a frame having a first end portion and a second end portion, a pair of actuating scoop jaws driven by a motor disposed on the first end portion of the frame, a handle disposed on the second end portion of the frame including a switch, the pair of scoop jaws configured to be actuated from an open position to a closed position by the switch, a bag including a pair of slots on an openable and closable end portion of the bag, each slot receiving one of the scoop jaws therethrough.

12 Claims, 3 Drawing Sheets

FECAL MATTER SCOOPER

TECHNICAL FIELD

Examples of the disclosure relate generally to a fecal matter scooper. More specifically, examples of the disclosure relate to a fecal matter scooper with scoop jaws having a bag attached thereto that forms an enclosed chamber when closed, thereby enclosing objects disposed therein.

BACKGROUND

Pets provide joy and companionship to persons of all ages. For all ages, it is a challenge to dispose of fecal matter.

Different types of devices have been developed to facilitate pick up and removal of fecal matter without a person having to come into direct contact with the fecal matter. These devices include hand operated fecal matter pickup devices, typically referred to as "poop scoopers," "pooper scoopers," or the like, which employ a long handle to enable the user to scoop or pick up fecal matter without bending down.

However, improvements to these fecal matter scoopers nonetheless remain desirable. Specifically, there is a need for a long-handled fecal matter scooper with scoop jaws having a bag attached thereto that forms an enclosed chamber when closed, thereby enclosing objects disposed therein that is more sanitary than conventional fecal matter scoopers.

SUMMARY

Broadly, examples of the disclosure provide a fecal matter scooper. According to some examples of the disclosure, the fecal matter scooper includes a frame having a first end and a second end, a pair of actuating scoop jaws driven by a motor disposed on the first end of the frame, a handle disposed on the second end of the frame including a switch, the pair of scoop jaws configured to be actuated from an open position to a closed position by the switch, a bag including a pair of slots on an upper end of the bag, each slot receiving one of the scoop jaws therethrough.

According to some examples of the disclosure, the first end of the frame includes a light source.

According to some examples of the disclosure, the second end of the frame includes a light switch operably connected to the light source.

According to some examples of the disclosure, the light source is a light-emitting diode.

According to some examples of the disclosure, the upper end of the bag further includes a drawstring.

According to some examples of the disclosure, the pair of scoop jaws is a pair of rods.

According to some examples of the disclosure, the pair of scoop jaws have a length of about 6 to 18 inches.

According to some examples of the disclosure, the frame has a length of about 24 to 48 inches According to some examples of the disclosure, the handle has a length of about 4 to 12 inches.

According to some examples of the disclosure, a secondary handle is disposed between the first end and the second end of the frame.

According to some examples of the disclosure, the frame is a hollow, tubular construction.

According to some examples of the disclosure, the frame is a telescopically adjustable extension shaft.

BRIEF DESCRIPTION OF THE DRAWINGS

The accompanying drawings, which are incorporated in and constitute a part of this specification, exemplify various examples of the disclosure and, together with the description, serve to explain and illustrate principles of the disclosure. The drawings are intended to illustrate major features of the exemplary examples in a diagrammatic manner. The drawings are not intended to depict every feature of actual examples nor relative dimensions of the depicted elements, and are not generally drawn to scale.

DETAILED DESCRIPTION

Figure 1:
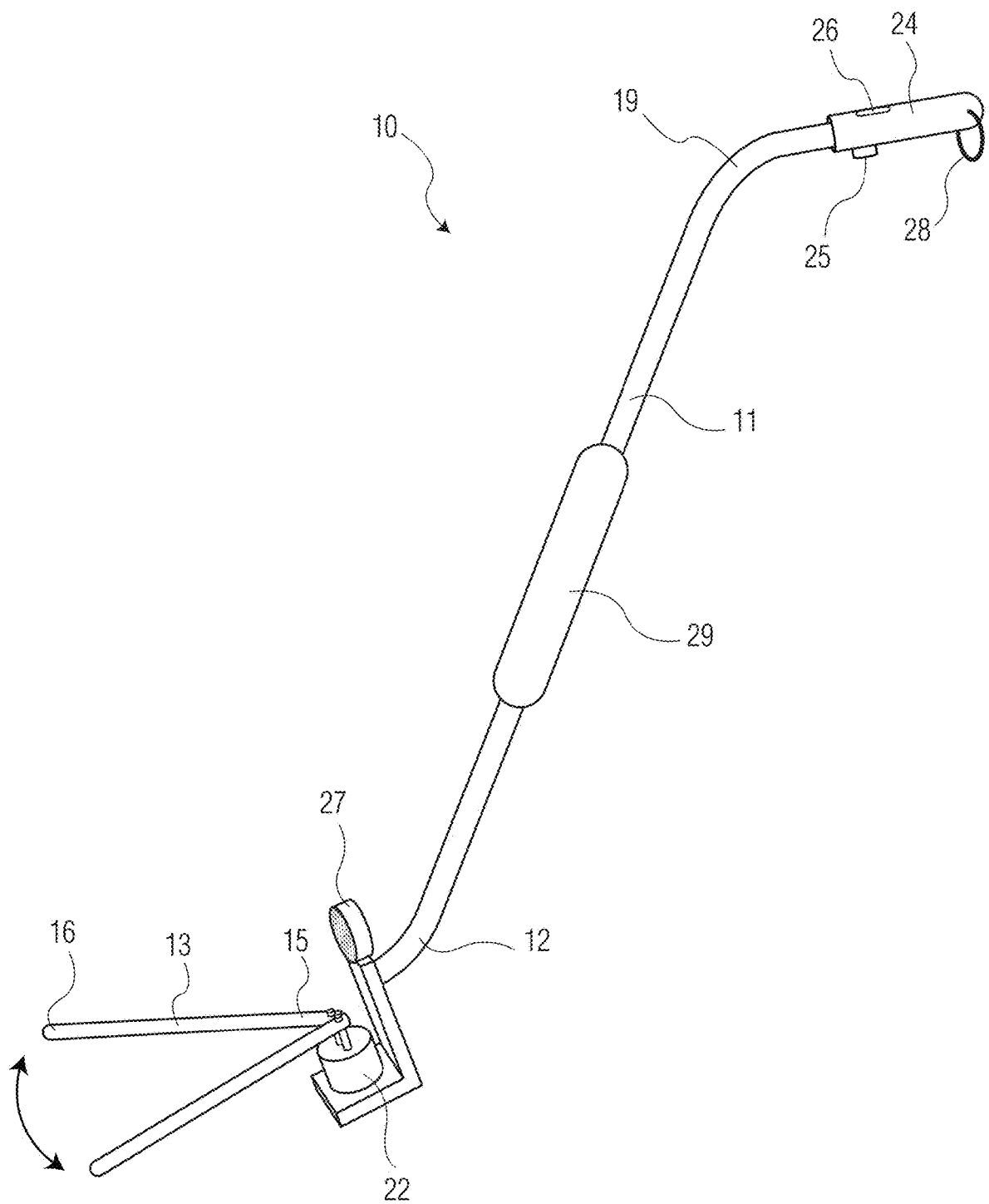
FIG. 1 shows a side perspective view of a fecal matter scooper according to some examples of the disclosure.

A new fecal matter scooper 10 is described. As shown in FIG. 1, the scooper 10 includes a frame 11 of hollow, tubular construction having a first end portion 12 and a second end portion 19. The frame 11 can be an telescopically adjustable extension shaft that can be extended and/or retracted in length, or the frame 11 can have one length and is not extendable or retractable in length. The tubular frame 11 is preferably has a length long enough to enable a user to operate the scooper 10 while standing up.

For some examples, the frame 11 can be fully extended to about 24 inches to about 48 inches. For some examples, the frame 11 can be fully extended to about 35 inches. The frame 11 can be made of any suitable material known in the art, such as aluminum.

Figure 2:
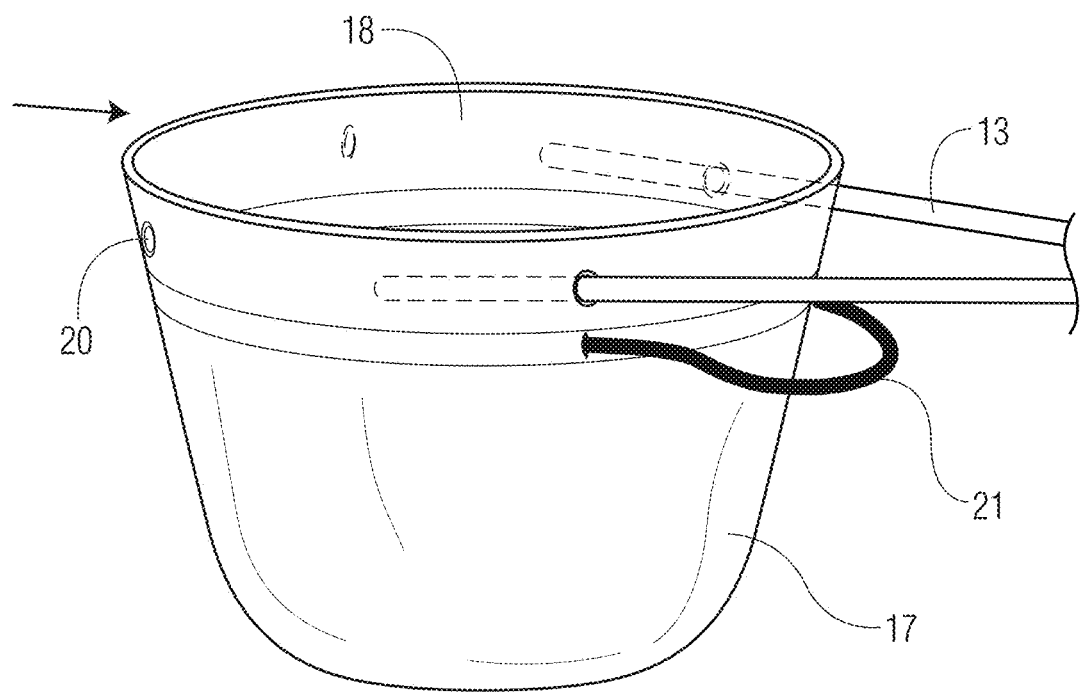
FIG. 2 shows a side perspective view of the fecal matter scooper in an open position according to some examples of the disclosure.
Figure 3:
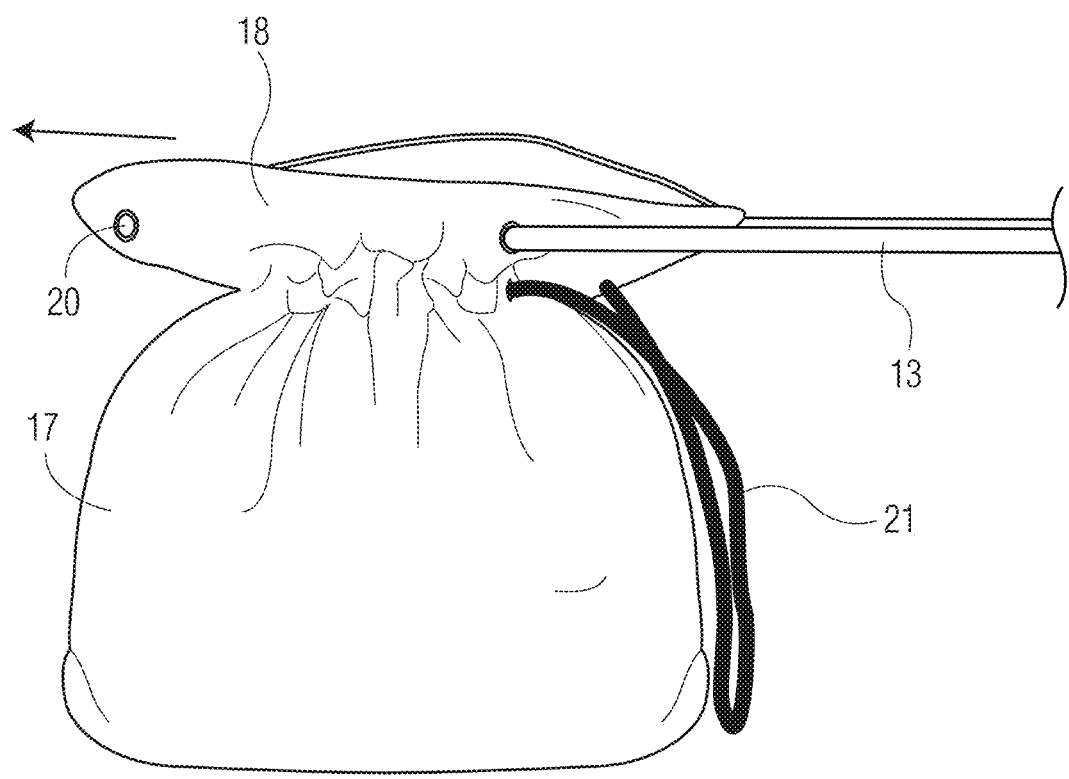
FIG. 3 shows a side perspective of the fecal matter scooper in a closed position according to some examples of the disclosure.

The first end portion 12 includes a pair of scoop jaws 13 that are pivotally attached to the frame 11. The pair of scoop jaws 13 are configured to be actuated into an open or closed position by a motor. As clearly shown in FIG. 2, the pair of scoop jaws 13 are in a closed position. In FIG. 3, the pair of scoop jaws 13 are in an open position, in which the pair of scoop jaws 13 are actuated outwardly from one another into the open position shown in FIG. 3.

For some examples, the pair of scoop jaws 13 can be rods each having a proximal end 15 and a distal end 16. The proximal ends 15 are operably connected to the motor to allow the pair of scoop jaws 13 to be actuated between the closed position and open position. As shown in FIG. 3, the pair of scoop jaws 13 are parallel to one another in the closed position. The distal ends 16 are extended away from one another by the motor to provide the open position as shown in FIG. 2.

For some examples, the pair of scoop jaws 13 can have any length long enough to extend under a pet, such as a dog, that is defecating. For example, the pair of scoop jaws 13 have a length of about 6 inches to about 18 inches. Preferably, the pair of scoop jaws 13 have a length of about 8 inches.

For some examples, a body 22 disposed on the first end portion 12 of the frame 11 encloses the motor. Preferably, the body 22 has a cylindrical body shape; however, other shapes are also suitable. The motor is operably connected to an electrical power storage, such as a battery. For some examples, the battery is also enclosed by the body 22. The motor and battery can be those known in the art. The body 22 can be a thermoplastic or thermoset material.

Figure 4:
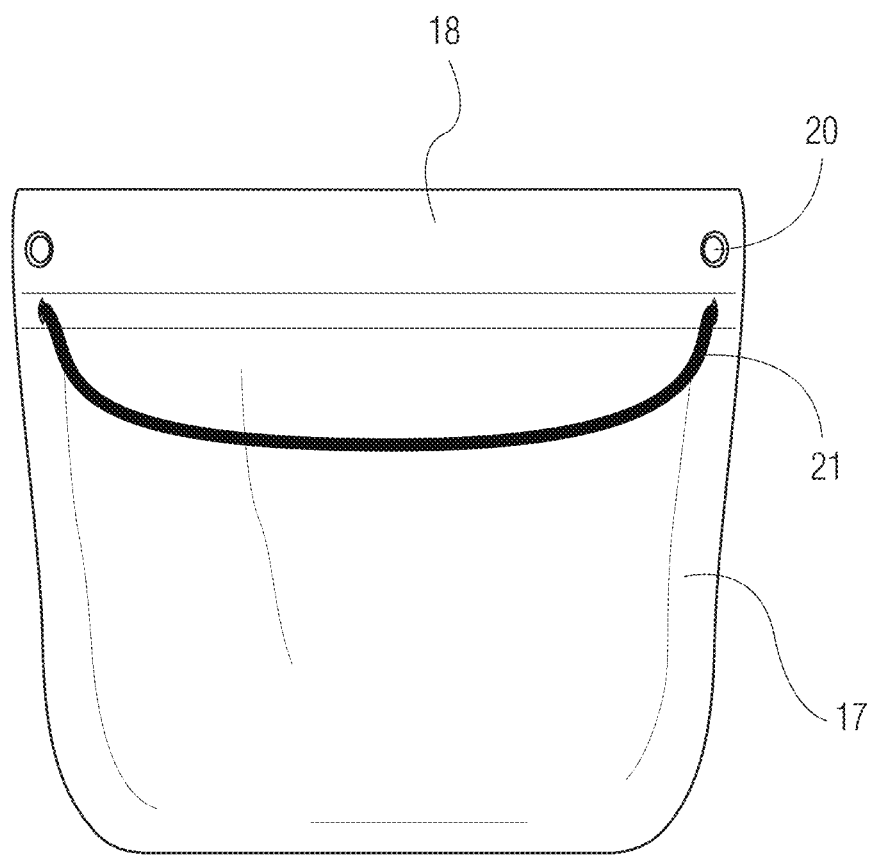
FIG. 4 shows a side perspective view of the bag of the fecal matter scooper according to some examples of the disclosure.

As shown in FIG. 4, a bag 17 can be attached to the pair of scoop jaws 13 to allow fecal matter to be disposed therein. For some examples, the bag 17 attached to the pair of scoop jaws 13 is positioned below a dog that is defecating. The pair of scoop jaws 13 are actuated into the open position from the closed position by the motor, thereby opening an openable and closable end portion 18 of the bag 17 and providing access to the cavity of the bag 17, in which fecal matter can be disposed therein. The pair of scoop jaws 13 are actuated into the closed position from the open position by the motor when the dog has finished defecating, thereby closing the openable and closable end portion 18 of the bag 17 and forming an enclosed chamber storing the fecal matter therein.

This enclosed chamber formed by the bag 17 when the scoop jaws 13 are in a closed position advantageously produces a more sanitary scooper 10 because it minimizes and prevents loss of matter from the enclosed chamber. Advantageously, the scooper 32 reduces disease transfer, insect infestation, parasitic outbreaks, and the like, particularly when the scoop jaws 13 are closed and the bag 17 forms an enclosed chamber storing the fecal matter therein. The user of the scooper 10 also advantageously does not need be in direct contact with the fecal matter.

As shown in FIG. 4, an openable and closable end portion 18 of the bag 17 includes a pair of slots 20 corresponding to the pair of scoop jaws 13. The pair of slots 20 are configured to receive the pair of scoop jaws 13 and have them extend therethrough, thereby holding the bag 17 in place on the first end portion 12 of the frame 11. The bag 17 is removed from the scooper 10 by extending the pair of scoop jaws 13 away from the pair of slots 20.

For some examples, the openable and closable end portion 18 of the bag 17 further includes a drawstring 21. The drawstring 21 allows for the end portion 18 of the bag 17 to be opened and closed. For some examples, the drawstring 21 is positioned under the pair of slots 20 on the bag 17. For some examples, the drawstring 21 is positioned above the pair of slots 20 on the bag 17. The bag 17 can be made of any suitable material known in the art. For some examples, the bag 17 is made from a thermoplastic material.

For some examples, a light source 27 is disposed above the body 22 and the pair of scoop jaws 13 at the first end portion 12 of the frame 11 as shown in FIG. 1. The light source 27 can be any suitable light source known in the art, such as a high-powered light-emitting diode (LED). The light source 27 is disposed on the second end 12 of the frame 11. The light source 27 can be powered by the battery. The light source 27 is configured to emit a bright, focused beam of light at a lower end of the handle 24 to illuminate the ground in front of a user, behind the user, and/or any surrounding area.

The second end portion 19 of the frame 11 includes a handle 24. The handle 24 can be made of any suitable material known in art, such as a thermoplastic or thermoset material for high friction gripping. The handle can have any suitable shape known in the art. Preferably, the handle 24 is an ergonomic handle.

For some examples, the handle 24 includes a switch 25 operably connected to the motor for actuating the scoop jaws 13 between the open and closed positions. That is, the switch 25 may be toggled to selectively actuate the scoops 13 between the open and closed positions. The switch 25 can be any suitable switch known in the art, such as a push-button switch or a toggle switch.

For some examples, the handle 24 includes a light switch 26 operably connected to a light source 27. That is, the light switch 26 may be toggled to selectively activate and deactivate the light source 27. The light source 27 can be any suitable light source known in the art, such as a high-powered light-emitting diode (LED). As shown in FIG. 1, the light source 27 is disposed on the second end 12 of the frame 11. The light source 27 can be powered by the battery. The light source 27 is configured to emit a bright, focused beam of light at a lower end of the handle 24 to illuminate the ground in front of a user, behind the user, and/or any surrounding area.

For some examples, the handle 24 further includes a ring hook 28 for removably hanging the scooper 10 on a hook, for example, a hook mounted to a wall. The ring hook 28 can be any suitable hook known in the art, such as a D-ring hook.

The handle 24 can have any length long enough for a user to grip the handle 24. For some examples, the handle 24 is about 4 inches to about 12 inches. Preferably, the handle 24 is about 6 inches long.

For some examples, a secondary handle 29 is disposed between the first end portion 12 and second end portion 19 of the frame 11. Preferably, the secondary handle 29 is centrally disposed between the first end portion 12 and second end portion 19 of the frame 11. The handle 24 can be made of any suitable material known in art, such as a thermoplastic or thermoset material for high friction gripping. The handle can have any suitable shape known in the art. Preferably, the handle 24 is an ergonomic handle.

During use and operation of the scooper 10, a user grasps the handle 24 to move the scooper 10 into a desired position relative to a pet, such as a dog. The user can toggle the light switch 26 to activate the light source 27 for better illumination, especially during use in dimly-lighted areas or at night. The user can toggle the switch 25 to actuate the pair of scoop jaws 13 from the closed position into the open position. By actuating the pair of scoop jaws 13 from the closed position into the open position, an openable and closable end portion 18 of the bag 17 is opened, which provides access to the cavity of the bag 17 and fecal matter can be disposed therein. The user can toggle the switch 25 to actuate the pair of scoop jaws 13 from the open position into the closed position pair of scoop jaws 13 when the pet has finished defecating, thereby closing the openable and closable end portion 18 of the bag 17 and forming an enclosed chamber storing the fecal matter therein.

The user removes the bag 17 from the pair of scoop jaws 13 by extending the pair of scoop jaws 13 away from the pair of slots 20. The user pulls the drawstring 21 tight to close the openable and closable end portion 18 of the bag 17. The user can then easily, securely, and safely deposit the bag 17 with the fecal matter therein elsewhere in a sanitary manner.

Various modifications and additions can be made to the exemplary examples discussed without departing from the scope of the disclosure. For example, while the examples described above refer to particular features, the scope of the disclosure also includes examples having different combinations of features and examples that do not include all of the described features. Accordingly, the scope of the disclosure is intended to embrace all such alternatives, modifications, and variations as fall within the scope of the claims, together with all equivalents thereof.

I claim:
1. A fecal matter scooper, comprising:
a frame having a first end portion and a second end portion;
a pair of actuating scoop jaws driven by a motor disposed on the first end portion of the frame;

a handle disposed on the second end portion of the frame including a switch, the pair of scoop jaws configured to be actuated from an open position to a closed position by the switch;

a bag including a pair of slots on an openable and closable end portion of the bag, each slot receiving one of the scoop jaws therethrough.

2. The fecal matter scooper according to claim 1, wherein the first end portion of the frame includes a light source.

3. The fecal matter scooper according to claim 2, wherein the second end portion of the frame includes a light switch operably connected to the light source.

4. The fecal matter scooper according to claim 3, wherein the light source is a light-emitting diode.

5. The fecal matter scooper according to claim 1, the openable and closable end portion of the bag further includes a drawstring.

6. The fecal matter scooper according to claim 1, wherein the pair of scoop jaws is a pair of rods.

7. The fecal matter scooper according to claim 1, wherein the pair of scoop jaws have a length of about 6 to 18 inches.

8. The fecal matter scooper according to claim 1, wherein the frame has a length of about 24 to 48 inches.

9. The fecal matter scooper according to claim 1, wherein the handle has a length of about 4 to 12 inches.

10. The fecal matter scooper according to claim 1, further comprising a secondary handle disposed between the first end portion and the second end portion of the frame.

11. The fecal matter scooper according to claim 1, wherein the frame is a substantially hollow, substantially tubular construction.

12. The fecal matter scooper according to claim 1, wherein the frame is a telescopically adjustable extension shaft.

* * * * *